US007419682B2

(12) United States Patent
Campbell et al.

(10) Patent No.: US 7,419,682 B2
(45) Date of Patent: Sep. 2, 2008

(54) POULTRY FEED CONTAINING PLASMA

(75) Inventors: Joy Campbell, Ames, IA (US); Louis E. Russell, Johnston, IA (US)

(73) Assignee: APC, Inc., Ankeny, IA (US)

( * ) Notice: Subject to any disclaimer, the term of this patent is extended or adjusted under 35 U.S.C. 154(b) by 15 days.

(21) Appl. No.: 10/929,836

(22) Filed: Aug. 30, 2004

(65) Prior Publication Data

US 2006/0045907 A1    Mar. 2, 2006

(51) Int. Cl.
A23K 1/04        (2006.01)
A23K 1/24        (2006.01)
(52) U.S. Cl. .......................... 424/442; 424/439; 514/2
(58) Field of Classification Search ................ 424/489, 424/439, 442, 157.1, 530
See application file for complete search history.

(56) References Cited

U.S. PATENT DOCUMENTS

| | | | | |
|---|---|---|---|---|
| 5,268,357 | A | * | 12/1993 | Yabiki et al. .................... 514/8 |
| 5,372,811 | A | | 12/1994 | Yoder |
| 5,575,999 | A | | 11/1996 | Yoder |
| 5,604,205 | A | * | 2/1997 | Makarov et al. .............. 514/21 |
| 5,985,336 | A | * | 11/1999 | Ivey et al. ...................... 426/2 |
| 6,004,576 | A | * | 12/1999 | Weaver et al. ................ 424/442 |
| 6,749,872 | B2 | | 6/2004 | Russell et al. |
| 2002/0122803 | A1 | * | 9/2002 | Kisic et al. ................ 424/164.1 |
| 2003/0099633 | A1 | | 5/2003 | Campbell et al. |
| 2003/0103962 | A1 | | 6/2003 | Campbell et al. |
| 2003/0104034 | A1 | * | 6/2003 | Campbell et al. ............ 424/439 |
| 2003/0190314 | A1 | | 10/2003 | Campbell et al. |
| 2004/0096440 | A1 | | 5/2004 | Weaver et al. |
| 2004/0197342 | A1 | | 10/2004 | Hattori et al. |
| 2004/0202660 | A1 | | 10/2004 | Campbell et al. |

FOREIGN PATENT DOCUMENTS

| | | | | |
|---|---|---|---|---|
| SU | 1250238 | A | * | 8/1986 |
| SU | 1558373 | A | * | 4/1990 |
| WO | WO0263948 | A2 | * | 2/2002 |

OTHER PUBLICATIONS

BASF, "Keeping Current: Vitamin Stability Through Expanders," KC 9401, Second Revised Edition, pp. 1-8, http://www.basf.com/animalnutrition/pdfs/kc_9401.pdf (Jul. 1998) (hereinafter the BASF '98 internet publication).*
Campbell JM, Quigley JD, Russell LE, Kidd MT, "Effect of Spray-Dried Bovine Serum on Intake, Health, and Growth of Broilers Housed in Different Environments," Journal of Animal Science, vol. 81, pp. 2776-2782 (2003).*
M.U. Steidinger et al. "Effects of Pelleting and Pellet Conditioning Temperatures on Weanling Pig Performance," J. Anim. Sci., 2000, vol. 78, pp. 3014-3018.*
APC, Inc., "The Basic Science Behind Spray-Dried Plasma and Serum Proteins", Series on Plasma and Serum Proteins, http://www.americanprotein.com/functional_prots/images/thebasicscience.pdf, No date listed on paper. Preceding page has copyright date of 2002. None of the references listed in the paper are newer than 2001., Copyright 2002),1-4.
BASF, "Keeping Current: Vitamin Stability Through Expanders", KC 9401, 2nd Revised Edition, http://www.basf.com/animalnutrition/pdfs/kc_9401.pdf,(1998),1-8.

Bregendahl, K , et al., "Dietary spray-dried plasma protein improves feed utilization, BW uniformity, and breast-meat yield of broilers raised in a relatively unsanitary environment", Journal of Dairy Science, vol. 87, Supplement I, Journal of Animal Science, vol. 82, Supplement I, Poultry Science, vol. 83, Supplement I, 2004 ADSA, ASAS, PSA Joint Meeting Abstracts,(2004),316.
Campbell, J. M., et al., "Effect of spray-dried bovine serum on intake, health, and growth of broilers housed in different environments", Journal of Animal Science, 81, (2003),2776-2782.
Dudley-Cash, William A., "Novel ways to improve broiler growth performance reviewed", Feedstuffs, 74(32), (Aug. 2002),1 Page.
Fairfield, David A., "Pelleting for Profit—Part 1", Feed and Feeding Digest, National Grain and Feed Association, 54(6), (Nov. 13, 2003),1-5.
Fairfield, David A., "Pelleting for Profit—Part 2", Feed and Feeding Digest, National Grain and Feed Association, 54(7), (Dec. 22, 2003),1-6.
Hammer, C J., et al., "Digestibility of dry dog kibble containing spray dried animal plasma",Journal of Dairy Science, vol. 87, Supplement I, Journal of Animal Science, vol. 82, Supplement I, Poultry Science, vol. 83, Supplement I, 2004 ADSA, ASAS, PSA Joint Meeting Abstracts,(2004),245.
King, M. R., et al., "Evaluation of Immunoglobulin-Fortified Protein Sources in Broiler Diets", Massey Technical Update Seminar: Proceedings, (2001),1 Page.
Longo, F. A., et al., "Effects of different protein sources in the feed of newly hatched chicks on broiler performance", Poultry Science Association 92nd Annual Meeting Abstracts, (Jul. 6-9, 2003),67.
McEllhiney, Robert R., "Feed manufacturing technology IV", Arlington, VA. : American Feed Industry Association, (1994),112-115, 123-125.
Multiple Authors, "Nutrient Requirements of Poultry", Washington : National Academy Press, 9th Revised Edition, Authors—Subcommittee on Poultry Nutrition, Committee on Animal Nutrition, Board on Agriculture, National Research Council,(1994),pp. 23, 27 & 36.
Multiple Authors, "Nutrient Requirements of Swine", Washington, D.C. : National Academy Press, 10th Revised Edition, Authors—Subcommittee on Swine Nutrition, Committee on Animal Nutrition, Board on Agriculture, National Research Council,(1998),111.
Payne, John , et al., "The Pelleting Handbook: A guide for Production Staff in the Compound Feed Industry", Borregaard Ligno Tech., Sarpsborg, Norway., (1994),16-17, 34-37.
Pierce, J. L., et al., "Assessment of spray-dried plasma protein from there species on performance of chicks.", Poultry Science 75 (Suppl. 1):36, Abstract, (1996),1 Page.
Quigely, III, J. D., et al., "Effects of spray-dried animal plasma on intake and apparent digestibility in dogs",Journal of Animal Science, 82, (2004),1685-1692.
Steidinger, M. U., et al., "Effects of pelleting and pellet conditioning temperatures on weanling pig performance", Journal of Animal Science, 78, (2000),3014-3018.
Yi, G F., et al., "Impact of glutamine, Menhaden ﬁsh meal and spray-dried plasma on the growth performance and intestinal morphology of broilers", Journal of Dairy Science, vol. 87, Supplement I, Journal of Animal Science, vol. 82, Supplement I , Poultry Science, vol. 83, Supplement I, 2004 ADSA, ASAS, PSA Joint Meeting Abstracts,(2004),201.

* cited by examiner

Primary Examiner—Johann Richter
Assistant Examiner—James H Alstrum Acevedo
(74) Attorney, Agent, or Firm—Schwegman, Lundberg & Woessner P.A.

(57) ABSTRACT

The present invention relates to pelleted poultry feed containing plasma, and methods of making and using pelleted poultry feed containing plasma.

27 Claims, No Drawings

POULTRY FEED CONTAINING PLASMA

FIELD OF THE INVENTION

The present invention relates to poultry feed containing plasma and methods of making and using poultry feed containing plasma.

BACKGROUND OF THE INVENTION

Improving the growth of animals such as chickens and turkeys is an important goal for producers that raise chickens and turkeys. Currently, in the United States, more than 80% of feed for non-ruminant animals such as chickens and turkeys is pelleted, and swine and poultry fed pelleted feed have improved growth performance (Fairfield, 2003a and 2003b).

Plasma can be added to a swine diet in order to increase feed intake and growth. However, increasing the conditioning temperature during the feed pelleting process decreases the growth-enhancing properties of the plasma for swine (Steidinger et al., 2000). There is currently a need for growth-enhancing feeds for poultry such as chickens and turkeys, such as pelleted feeds.

SUMMARY OF CERTAIN EMBODIMENTS OF THE INVENTION

It has been unexpectedly discovered that poultry feed containing plasma can be prepared in a pelleted form using elevated temperatures during the pelleting process. It was also unexpected that, as compared to feed prepared without plasma, feed prepared using elevated temperatures that includes plasma has increased growth-promoting characteristics.

Accordingly, the present invention provides a method for preparing a pelleted poultry feed, including heating a mixture including animal plasma and poultry feed to a temperature of at least about 77° C. and pelleting the mixture to provide the pelleted poultry feed. In some embodiments of the present invention, the pelleted poultry feed is feed for chickens, for example, broilers, and/or layers. In some embodiments of the invention, the pelleted poultry feed is feed for turkeys.

The present invention also provides pelleted poultry feed prepared according to the method of the invention. Also provided are methods for enhancing the growth of poultry, including feeding to poultry an effective amount of the pelleted poultry feed of the invention. In some embodiments of the invention, poultry fed the pelleted poultry feed of the invention have increases in their average daily gain, average daily feed intake, feed efficiency (gain:feed), and/or increases in their body weight.

DETAILED DESCRIPTION OF THE INVENTION

It is currently accepted that specialty ingredients such as plasma proteins will be damaged, e.g., by heat denaturing, by the pelleting process used to manufacture pelleted feed. Thus, it is believed that improvements in animal performance, for example, average daily gain (ADG), average daily feed intake (ADFI), feed efficiency (gain:feed), and/or body weight (BW), that may result from plasma consumption, would be reduced or eliminated if the plasma is subjected to high temperatures, for example, during a pelleting process (see Steidinger et al., 2000). Unexpectedly, it has been discovered that broilers fed pelleted feed that was formulated to contain plasma and manufactured using elevated conditioning temperatures have increased growth as compared to broilers that were fed similar feed that did not contain plasma. Thus, it has been discovered that it is possible to include sensitive proteins such as plasma proteins in feed prior to heating and pelleting without loss of function or nutritional value.

It has been unexpectedly discovered that feed, for example poultry feed for chickens or turkeys, containing plasma can be prepared in a pelleted form using elevated temperatures during the pelleting process while maintaining the growth-promoting characteristics of the plasma. Feed so prepared unexpectedly has growth-promoting characteristics that are attributed to the inclusion of the plasma in the pelleted feed.

Accordingly, the present invention provides a method for preparing a pelleted poultry feed including heating a mixture including animal plasma and poultry feed to a temperature of at least about 77° C. and pelleting the mixture to provide the pelleted poultry feed. The pelleted poultry feed can be pelleted chicken feed or pelleted turkey feed. The pelleted poultry feed contains a growth-promoting amount of animal plasma in a form that promotes poultry growth as compared to a pelleted poultry feed that does not contain plasma. The method optionally includes the step of crumbling the pelleted poultry feed, for example, for very young poultry. The method also optionally includes the step of processing the mixture with an expander, for example, prior to pelleting. In some embodiments of the invention, following processing with the expander, the mixture is not pelleted, but can optionally be crumbled. The present invention also provides pelleted poultry feed prepared according to the methods of the invention.

In some embodiments of the invention, the animal plasma is dried, e.g., spray-dried, animal plasma, e.g., from a bovine, porcine, and/or avian source. In some embodiments of the invention, the poultry feed is turkey feed. In some embodiments of the invention, the poultry feed is chicken feed, for example, feed for layers, or broilers.

In some embodiments of the invention, the pelleted poultry feed is poultry feed formulated for phase feeding. For example, the feed may be feed specifically formulated for the prestarter phase, the starter phase, the grower phase, or the finisher phase for poultry such as chickens (e.g., broilers and layers) and turkeys.

In some embodiments of the invention, the pelleted poultry feed includes about 1%, about 0.5%, or about 0.25% plasma. In some embodiments of the invention, the pelleted poultry feed includes about 0.1% to about 5% plasma. In some embodiments of the invention, the pelleted poultry feed includes about 0.25% to about 1% plasma. Generally, the concentration of plasma is higher in the earlier phases of feeding, and the percentage of plasma is generally decreased during later phases of feeding.

In some embodiments of the invention, the mixture containing the plasma and the poultry feed is heated to about 80° C., 85° C., 90° C., 95° C., 100° C., 105° C., 110° C., 115° C., 120° C., at least about 77° C., at least about 80° C., at least about 85° C., at least about 90° C., at least about 95° C., at least about 100° C., at least about 105° C., at least about 110° C., at least about 115° C., or at least about 120° C. The term "about" as used herein is intended to encompass variations in the temperature throughout the body of the volume of the feed that is heated as well as imprecision in determined temperatures at individual points, as would be recognized by one of skill in the art.

In some embodiments of the invention, the growth-promoting amount of animal plasma in a form that promotes poultry growth is an amount that increases the average daily gain (ADG) of the poultry, e.g., turkeys or chickens. In some embodiments of the invention, the growth-promoting amount of animal plasma in a form that promotes poultry growth is an amount that increases the average daily feed intake (ADFI) of the poultry. In some embodiments of the invention, the growth-promoting amount of animal plasma in a form that promotes poultry growth is an amount that increases the body weight (BW) of the poultry. In some embodiments of the invention, the growth-promoting amount of animal plasma in a form that promotes poultry growth is an amount that improves the feed efficiency (gain:feed) of the poultry.

The present invention also provides a method for enhancing the growth of poultry, including feeding to poultry an effective amount of the pelleted poultry feed of the invention. In some embodiments of the invention, the pelleting poultry feed is fed to poultry during a specific phase of feeding. For example, the feed may be feed for the prestarter phase, the starter phase, the grower phase, or the finisher phase for poultry such as chickens (e.g., broilers and layers) and turkeys.

In some embodiments of the invention, the poultry are turkeys. In some embodiments of the invention, the poultry are chickens, for example, layers and/or broilers.

Also provided are methods for enhancing the growth of poultry, including feeding to poultry an effective amount of the pelleted poultry feed of the invention. In some embodiments of the invention, poultry fed the pelleted poultry feed of the invention have increases in their average daily gain (ADG), average daily feed intake (ADFI), feed efficiency (gain:feed), and/or increases in their body weight (BW).

The pelleted feeds of the present invention are useful as feed for birds, for example, for poultry. "Poultry" as used herein, generally refers to male and female birds reared for their flesh, eggs, feathers and/or other parts of their body, such as, but not limited to, chickens, turkeys, ostrich, cockatiels, game birds and water fowl, for instance, pheasant, geese and ducks, including hens kept for laying eggs (layers), male chickens castrated when young to improve the quality of their flesh for food (capons) and young chickens suitable for broiling (broilers).

As used herein, a "growth-promoting amount" of plasma in the pelleted poultry feed of the invention is an amount of plasma in a form that causes poultry that consume the pelleted poultry feed as at least a part of their diet to grow at an increased rate as compared to poultry that consume a poultry feed that does not contain the growth-promoting plasma. As described herein, it was unexpectedly discovered that pelleting poultry feed containing plasma at higher temperatures, for example, at about 80° C., at about 85° C., at about 90° C., or at about 95° C., did not eliminate the growth-promoting characteristics of the plasma. Thus, such pelleted poultry feed that is heated and pelleted from a mixture of poultry feed and plasma retains the growth-promoting characteristics from the plasma. In other words, the pelleted poultry feed of the invention contains plasma in a form that retains at least some, all, or more, of the growth-promoting characteristics of plasma.

As used herein, "poultry feed" refers to feed that is formulated and produced to be fed to poultry, for example, specifically to poultry. For example, the National Research Council provides guidelines for the nutritional requirements of poultry (see Nutrition Requirements of Poultry, 9th edition, National Academy Press, Washington, D.C. (1994)). As reproduced from the Nutrition Requirements of Poultry, 9th edition, National Academy Press, Washington, D.C. (1994), the nutritional requirements of turkeys are provided in Table A, the nutritional requirements of broilers are provided in Table B, and the nutritional requirements of layers are provided in Table C. In some embodiments of the invention, the pelleted poultry feeds of the invention meet or exceed the guidelines provided by the National Research Council, for example, for any or all of the nutrients listed in the guidelines such as for protein (e.g., crude protein), fat, and macrominerals, trace minerals, fat soluble vitamins, and water soluble vitamins. As is apparent in the Tables, feed can be specifically formulated for turkeys, broilers, and layers.

Several characteristics of some specific poultry feeds of the invention include those feeds having a crude protein content of about 23%, an oil content of about 4.5%, a fiber content of about 3%; and a crude protein content of about 19%, an oil content of about 5.5%, a fiber content of about 3%. Other specific poultry feeds are characterized in Tables A, B, C, 2, and 7.

TABLE A

Nutrient Requirements of Turkeys as Percentages or Units per Kilogram of Diet (90 percent dry matter)

| | | Growing Turkeys, Males and Females | | | | | | Breeders | |
| --- | --- | --- | --- | --- | --- | --- | --- | --- | --- |
| | | 0 to 4 Weeks[a]; 0 to 4 Weeks[b]; 2,800[c] | 4 to 8 Weeks[a]; 4 to 8 Weeks[b]; 2,900[c] | 8 to 12 Weeks[a]; 8 to 11 Weeks[b]; 3,000[c] | 12 to 16 Weeks[a]; 11 to 14 Weeks[b]; 3,100[c] | 16 to 20 Weeks[a]; 14 to 17 Weeks[b]; 3,200[c] | 20 to 24 Weeks[a]; 17 to 20 Weeks[b]; 3,300[c] | Holding; 2,900[c] | Laying Hens; 2,900[c] |
| Nutrient | Unit | | | | | | | | |
| Protein and amino acids | | | | | | | | | |
| Protein[d] | % | 28.0 | 26 | 22 | 19 | 16.5 | 14 | 12 | 14 |
| Arginine | % | 1.6 | 1.4 | 1.1 | 0.9 | 0.75 | 0.6 | 0.5 | 0.6 |
| Glycine + serine | % | 1.0 | 0.9 | 0.8 | 0.7 | 0.6 | 0.5 | 0.4 | 0.5 |
| Histidine | % | 0.58 | 0.5 | 0.4 | 0.3 | 0.25 | 0.2 | 0.2 | 0.3 |
| Isoleucine | % | 1.1 | 1.0 | 0.8 | 0.6 | 0.5 | 0.45 | 0.4 | 0.5 |
| Leucine | % | 1.9 | 1.75 | 1.5 | 1.25 | 1.0 | 0.8 | 0.5 | 0.5 |
| Lysine | % | 1.6 | 1.5 | 1.3 | 1.0 | 0.8 | 0.65 | 0.5 | 0.6 |
| Methionine | % | 0.55 | 0.45 | 0.4 | 0.35 | 0.25 | 0.25 | 0.2 | 0.2 |
| Methionine + cystine | % | 1.05 | 0.95 | 0.8 | 0.65 | 0.55 | 0.45 | 0.4 | 0.4 |
| Phenylalanine | % | 1.0 | 0.9 | 0.8 | 0.7 | 0.6 | 0.5 | 0.4 | 0.55 |
| Phenylalanine + tyrosine | % | 1.8 | 1.6 | 1.2 | 1.0 | 0.9 | 0.9 | 0.8 | 1.0 |
| Threonine | % | 1.0 | 0.95 | 0.8 | 0.75 | 0.6 | 0.5 | 0.4 | 0.45 |
| Tryptophan | % | 0.26 | 0.24 | 0.2 | 0.18 | 0.15 | 0.13 | 0.1 | 0.13 |
| Valine | % | 1.2 | 1.2 | 0.9 | 0.8 | 0.7 | 0.6 | 0.5 | 0.58 |
| Fat | | | | | | | | | |
| Linoleic Acid | % | 1.0 | 1.0 | 0.8 | 0.8 | 0.8 | 0.8 | 0.8 | 1.1 |
| Macrominerals | | | | | | | | | |
| Calcium[e] | % | 1.2 | 1.0 | 0.85 | 0.75 | 0.65 | 0.55 | 0.5 | 2.25 |

TABLE A-continued

Nutrient Requirements of Turkeys as Percentages or Units per Kilogram of Diet (90 percent dry matter)

| | | Growing Turkeys, Males and Females | | | | | | Breeders | |
|---|---|---|---|---|---|---|---|---|---|
| | | 0 to 4 Weeks[a]; 0 to 4 Weeks[b]; 2,800[c] | 4 to 8 Weeks[a]; 4 to 8 Weeks[b]; 2,900[c] | 8 to 12 Weeks[a]; 8 to 11 Weeks[b]; 3,000[c] | 12 to 16 Weeks[a]; 11 to 14 Weeks[b]; 3,100[c] | 16 to 20 Weeks[a]; 14 to 17 Weeks[b]; 3,200[c] | 20 to 24 Weeks[a]; 17 to 20 Weeks[b]; 3,300[c] | Holding; 2,900[c] | Laying Hens; 2,900[c] |
| Nutrient | Unit | | | | | | | | |
| Nonphytate phosphorus[f] | % | 0.6 | 0.5 | 0.42 | 0.38 | 0.32 | 0.28 | 0.25 | 0.35 |
| Potassium | % | 0.7 | 0.6 | 0.5 | 0.5 | 0.4 | 0.4 | 0.4 | 0.6 |
| Sodium | % | 0.17 | 0.15 | 0.12 | 0.12 | 0.12 | 0.12 | 0.12 | 0.12 |
| Chlorine | % | 0.15 | 0.14 | 0.14 | 0.12 | 0.12 | 0.12 | 0.12 | 0.12 |
| Magnesium | mg | 500 | 500 | 500 | 500 | 500 | 500 | 500 | 500 |
| Trace minerals | | | | | | | | | |
| Manganese | mg | 60 | 60 | 60 | 60 | 60 | 60 | 60 | 60 |
| Zinc | mg | 70 | 65 | 50 | 40 | 40 | 40 | 40 | 65 |
| Iron | mg | 80 | 60 | 60 | 60 | 50 | 50 | 50 | 60 |
| Copper | mg | 8 | 8 | 6 | 6 | 6 | 6 | 6 | 8 |
| Iodine | mg | 0.4 | 0.4 | 0.4 | 0.4 | 0.4 | 0.4 | 0.4 | 0.4 |
| Selenium | mg | 0.2 | 0.2 | 0.2 | 0.2 | 0.2 | 0.2 | 0.2 | 0.2 |
| Fat soluble vitamins | | | | | | | | | |
| A | IU | 5,000 | 5,000 | 5,000 | 5,000 | 5,000 | 5,000 | 5,000 | 5,000 |
| $D_3$[g] | ICU | 1,100 | 1,100 | 1,100 | 1,100 | 1,100 | 1,100 | 1,100 | 1,100 |
| E | IU | 12 | 12 | 10 | 10 | 10 | 10 | 10 | 25 |
| K | mg | 1.75 | 1.5 | 1.0 | 0.75 | 0.75 | 0.50 | 0.5 | 1.0 |
| Water soluble vitamins | | | | | | | | | |
| $B_{12}$ | mg | 0.003 | 0.003 | 0.003 | 0.003 | 0.003 | 0.003 | 0.003 | 0.003 |
| Biotin[h] | mg | 0.25 | 0.2 | 0.125 | 0.125 | 0.100 | 0.100 | 0.100 | 0.20 |
| Choline | mg | 1,600 | 1,400 | 1,100 | 1,100 | 950 | 800 | 800 | 1,000 |
| Folacin | mg | 1.0 | 1.0 | 0.8 | 0.8 | 0.7 | 0.7 | 0.7 | 1.0 |
| Niacin | mg | 60.0 | 60.0 | 50.0 | 50.0 | 40.0 | 40.0 | 40.0 | 40.0 |
| Pantothenic acid | mg | 10.0 | 9.0 | 9.0 | 9.0 | 9.0 | 9.0 | 9.0 | 16.0 |
| Pyridoxine | mg | 4.5 | 4.5 | 3.5 | 3.5 | 3.0 | 3.0 | 3.0 | 4.0 |
| Riboflavin | mg | 4.0 | 3.6 | 3.0 | 3.0 | 2.5 | 2.5 | 2.5 | 4.0 |
| Thiamin | mg | 2.0 | 2.0 | 2.0 | 2.0 | 2.0 | 2.0 | 2.0 | 2.0 |

[a]The age intervals for nutrient requirements of males are based on actual chronology from previous research. Genetic improvements in body weight gain have led to an earlier implementation of these levels, at 0 to 3, 3 to 6, 6 to 9, 9 to 12, 12 to 15, and 15 to 18 weeks, respectively, by the industry at large.
[b]The age intervals for nutrient requirements of females are based on actual chronology from pervious research. Genetic improvements in body weight gain have led to an earlier implementation of these levels, at 0 to 3, 3 to 6, 6 to 9, 9 to 12, 12 to 14, and 14 to 16 weeks, respectively, by the industry at large.
[c]These are approximate metabolizable energy (ME) values provided with typical corn-soybean-meal-based feeds, expressed in kcal $ME_n$/kg diet. Such energy, when accompanied by the nutrient levels suggested, is expected to provide near-maximum growth, particularly with pelleted feed.
[d]Turkeys do not have a requirement for crude protein per se. There, however, should be sufficient crude protein to ensure an adequate nitrogen supply for synthesis of nonessential amino acids. Suggested requirements for crude protein are typical of those derived with corn-soybean meal diets, and levels can be reduced when synthetic amino acids are used.
[e]The calcium requirement may be increased when diets contain high levels of phytate phosphorus (Nelson, 1984).
[f]Organic phosphorus is generally considered to be associated with phytin and of limited availability.
[g]These concentrations of vitamin D are considered satisfactory when the associated calcium and phosphorus levels are used.
[h]Requirements may increase with wheat-based diets.

TABLE B

Nutrient Requirements of Broilers as Percentages or Units per Kilogram of Diet (90 percent dry matter)

| Nutrient | Unit | 0 to 3 Weeks[a]; 3,200[b] | 3 to 6 Weeks[a]; 3,200[b] | 6 to 8 Weeks[a]; 3,200[b] |
|---|---|---|---|---|
| Protein and amino acids | | | | |
| Crude protein[c] | % | 23.00 | 20.00 | 18.00 |
| Arginine | % | 1.25 | 1.10 | 1.00 |
| Glycine + serine | % | 1.25 | 1.14 | 0.97 |
| Histidine | % | 0.35 | 0.32 | 0.27 |
| Isoleucine | % | 0.80 | 0.73 | 0.62 |
| Leucine | % | 1.20 | 1.09 | 0.93 |
| Lysine | % | 1.10 | 1.00 | 0.85 |
| Methionine | % | 0.50 | 0.38 | 0.32 |
| Methionine + cystine | % | 0.90 | 0.72 | 0.60 |
| Phenylalanine | % | 0.72 | 0.65 | 0.56 |
| Phenylalanine + tyrosine | % | 1.34 | 1.22 | 1.04 |
| Proline | % | 0.60 | 0.55 | 0.46 |
| Threonine | % | 0.80 | 0.74 | 0.68 |
| Tryptophan | % | 0.20 | 0.18 | 0.16 |
| Valine | % | 0.90 | 0.82 | 0.70 |

TABLE B-continued

Nutrient Requirements of Broilers as Percentages or Units per Kilogram of Diet (90 percent dry matter)

| Nutrient | Unit | 0 to 3 Weeks[a]; 3,200[b] | 3 to 6 Weeks[a]; 3,200[b] | 6 to 8 Weeks[a]; 3,200[b] |
|---|---|---|---|---|
| Fat | | | | |
| Linoleic acid | % | 1.00 | 1.00 | 1.00 |
| Macrominerals | | | | |
| Calcium[d] | % | 1.00 | 0.90 | 0.80 |
| Chlorine | % | 0.20 | 0.15 | 0.12 |
| Magnesium | mg | 600 | 600 | 600 |
| Nonphytate phosphorus | % | 0.45 | 0.35 | 0.30 |
| Potassium | % | 0.30 | 0.30 | 0.30 |
| Sodium | % | 0.20 | 0.15 | 0.12 |
| Trace minerals | | | | |
| Copper | mg | 8 | 8 | 8 |
| Iodine | mg | 0.35 | 0.35 | 0.35 |
| Iron | mg | 80 | 80 | 80 |
| Manganese | mg | 60 | 60 | 60 |
| Selenium | mg | 0.15 | 0.15 | 0.15 |
| Zinc | mg | 40 | 40 | 40 |
| Fat soluble vitamins | | | | |
| A | IU | 1,500 | 1,500 | 1,500 |
| D$_3$ | ICU | 200 | 200 | 200 |
| E | IU | 10 | 10 | 10 |
| K | mg | 0.50 | 0.50 | 0.50 |
| Water soluble vitamins | | | | |
| B$_{12}$ | mg | 0.01 | 0.01 | 0.007 |
| Biotin | mg | 0.15 | 0.15 | 0.12 |
| Choline | mg | 1,300 | 1,000 | 750 |
| Folacin | mg | 0.55 | 0.55 | 0.50 |
| Niacin | mg | 35 | 30 | 25 |
| Pantothenic acid | mg | 10 | 10 | 10 |
| Pyridoxine | mg | 3.5 | 3.5 | 3.0 |
| Riboflavin | mg | 3.6 | 3.6 | 3 |
| Thiamin | mg | 1.80 | 1.80 | 1.80 |

[a]The 0- to 3-, 3- to 6-, and 6- to 8-week intervals for nutrient requirements are based on chronology for which research data were available; however, these nutrient requirements are often implemented at younger age intervals or on a weight-of-feed consumed basis.
[b]These are typical dietary energy concentrations, expressed in kcal ME$_n$/kg diet. Different energy values may be appropriate depending on local ingredient prices and availability.
[c]Broiler chickens do not have a requirement for crude protein per se. There, however, should be sufficient crude protein to ensure an adequate nitrogen supply for synthesis of nonessential amino acids. Suggested requirements for crude protein are typical of those derived with corn-soybean meal diets, and levels can be reduced when synthetic amino acids are used.
[d]The calcium requirement may be increased when diets contain high levels of phytate phosphorus (Nelson, 1984).

TABLE C

Nutrient Requirements of Leghorn-Type Laying Hens as Percentages or Units per Kilogram of Diet (90 percent dry matter)

| Nutrient | Unit | Dietary Concentrations Required by White-Egg Layers at Different Feed Intakes | | | Amounts Required per Hen Daily (mg or UI) | | |
|---|---|---|---|---|---|---|---|
| | | 80[a,b] | 100[a,b] | 120[a,b] | White-Egg Breeders at 100 g of Feed per Hen Daily[b] | White-Egg Layers at 100 g of Feed per Hen Daily | Brown-Egg Layers at 110 g of Feed per Hen Daily[c] |
| Protein and amino acids | | | | | | | |
| Crude protein[d] | % | 18.8 | 15.0 | 12.5 | 15,000 | 15,000 | 16,500 |
| Arginine[e] | % | 0.88 | 0.70 | 0.58 | 700 | 700 | 770 |
| Histidine | % | 0.21 | 0.17 | 0.14 | 170 | 170 | 190 |
| Isoleucine | % | 0.81 | 0.65 | 0.54 | 650 | 650 | 715 |
| Leucine | % | 1.03 | 0.82 | 0.68 | 820 | 820 | 900 |
| Lysine | % | 0.86 | 0.69 | 0.58 | 690 | 690 | 760 |
| Methionine | % | 0.38 | 0.30 | 0.25 | 300 | 300 | 330 |
| Methionine + cystine | % | 0.73 | 0.58 | 0.48 | 580 | 580 | 645 |
| Phenylalanine | % | 0.59 | 0.47 | 0.39 | 470 | 470 | 520 |
| Phenylalanine + tyrosine | % | 1.04 | 0.83 | 0.69 | 830 | 830 | 910 |
| Threonine | % | 0.59 | 0.47 | 0.39 | 470 | 470 | 520 |
| Tryptophan | % | 0.20 | 0.16 | 0.13 | 160 | 160 | 175 |
| Valine | % | 0.88 | 0.70 | 0.58 | 700 | 700 | 770 |
| Fat | | | | | | | |
| Linoleic acid | % | 1.25 | 1.0 | 0.83 | 1,000 | 1,000 | 1,100 |
| Macrominerals | | | | | | | |
| Calcium[f] | % | 4.06 | 3.25 | 2.71 | 3,250 | 3,250 | 3,600 |
| Chloride | % | 0.16 | 0.13 | 0.11 | 130 | 130 | 145 |
| Magnesium | mg | 625 | 500 | 420 | 50 | 50 | 55 |
| Nonphytate phosphorus[g] | % | 0.31 | 0.25 | 0.21 | 250 | 250 | 275 |
| Potassium | % | 0.19 | 0.15 | 0.13 | 150 | 150 | 165 |
| Sodium | % | 0.19 | 0.15 | 0.13 | 150 | 150 | 165 |

TABLE C-continued

Nutrient Requirements of Leghorn-Type Laying Hens as Percentages or Units per Kilogram of Diet
(90 percent dry matter)

| | | Dietary Concentrations Required by White-Egg Layers at Different Feed Intakes | | | Amounts Required per Hen Daily (mg or UI) | | |
|---|---|---|---|---|---|---|---|
| Nutrient | Unit | 80[a,b] | 100[a,b] | 120[a,b] | White-Egg Breeders at 100 g of Feed per Hen Daily[b] | White-Egg Layers at 100 g of Feed per Hen Daily | Brown-Egg Layers at 110 g of Feed per Hen Daily[c] |
| Trace minerals | | | | | | | |
| Copper | mg | ? | ? | ? | ? | ? | ? |
| Iodine | mg | 0.044 | 0.035 | 0.029 | 0.010 | 0.004 | 0.004 |
| Iron | mg | 56 | 45 | 38 | 6.0 | 4.5 | 5.0 |
| Manganese | mg | 25 | 20 | 17 | 2.0 | 2.0 | 2.2 |
| Selenium | mg | 0.08 | 0.06 | 0.05 | 0.006 | 0.006 | 0.006 |
| Zinc | mg | 44 | 35 | 29 | 4.5 | 3.5 | 3.9 |
| Fat soluble vitamins | | | | | | | |
| A | IU | 3,750 | 3,000 | 2,500 | 300 | 300 | 330 |
| $D_3$ | IU | 375 | 300 | 250 | 30 | 30 | 33 |
| E | IU | 6 | 5 | 4 | 1.0 | 0.5 | 0.55 |
| K | mg | 0.6 | 0.5 | 0.4 | 0.1 | 0.05 | 0.055 |
| Water soluble vitamins | | | | | | | |
| $B_{12}$ | mg | 0.004 | 0.004 | 0.004 | 0.008 | 0.0004 | 0.0004 |
| Biotin | mg | 0.13 | 0.10 | 0.08 | 0.01 | 0.01 | 0.011 |
| Choline | mg | 1,310 | 1,050 | 875 | 105 | 105 | 115 |
| Folacin | mg | 0.31 | 0.25 | 0.21 | 0.035 | 0.025 | 0.028 |
| Niacin | mg | 12.5 | 10.0 | 8.3 | 1.0 | 1.0 | 1.1 |
| Pantothenic acid | mg | 2.5 | 2.0 | 1.7 | 0.7 | 0.20 | 0.22 |
| Pyridoxine | mg | 3.1 | 2.5 | 2.1 | 0.45 | 0.25 | 0.28 |
| Riboflavin | mg | 3.1 | 2.5 | 2.1 | 0.36 | 0.25 | 0.28 |
| Thiamin | mg | 0.88 | 0.70 | 0.60 | 0.07 | 0.07 | 0.08 |

[a]Grams feed intake per hen daily.
[b]Based on dietary $ME_n$ concentrations of approximately 2,900 kcal/kg and an assumed rate of egg production of 90 percent (90 eggs per 100 hens daily).
[c]Italicized values are based on those from white-egg layers but were increased 10 percent because of larger body weight and possibly more egg mass per day.
[d]Laying hens do not have a requirement for crude protein per se. However, there should be sufficient crude protein to ensure an adequate supply of nonessential amino acids. Suggested requirements for crude protein are typical of those derived with corn-soybean meal diets, and levels can be reduced somewhat when synthetic amino acids are used.
[e]Italicized amino acid values for white-egg-laying chickens were estimated by using Model B (Hurwitz and Bornstein, 1973), assuming a body weight of 1,800 g and 47 g of egg mass per day.
[f]The requirement may be higher for maximum eggshell thickness.
[g]The requirement may be higher in very hot temperatures.

Plasma

Plasma can be obtained by the art worker from various sources, for example, from animal sources such as bovine, porcine, and/or avian sources. In some embodiments of the invention, the plasma is the plasma component of blood that has been separated from blood. In some embodiments of the invention, the plasma is plasma that has not been separated from blood, i.e., blood is combined with the poultry feed. The plasma may be in the form of dried plasma, for example, freeze-dried, paddle-dried, and/or spray-dried animal plasma. The plasma can be dried by any method that does not cause the plasma to lose its functionality as a growth-promoting additive to feed. Commercially available forms of plasma are available, for example, from APC Inc., Ankeny, Iowa.

Preparing the Pelleted Poultry Feed

The pelleted poultry feed can be prepared, for example, by any process suitable to produce pelleted poultry feed, for example, by subjecting the mixtures of poultry feed and plasma to elevated conditioning temperatures (for example, see Table 8) and pelleting the mixtures, e.g., using a 5/32 inch×1¼ inch die and conditioning retention time of about 15 seconds, to produce the pelleted poultry feed. In some embodiments of the invention, the method for producing the pelleted poultry feed includes the step of conditioning with an expander, which can involve temperatures that can reach and exceed about 120° C. General pelleting procedures, including the use of expanders, are known to the art worker (see Fairfield, (2003a and 2003b; Feed Manufacturing Technology IV, (1994); and The Pelleting Handbook, (1994)). The pelleted poultry feed of the invention may be crumbled by methods known to the art worker, for example, for use in a starter phase diet.

The invention will now be illustrated by the following non-limiting Examples.

EXAMPLE 1

Effects of Plasma Location and Pellet Conditioning Temperature on Broiler Feed Containing Plasma on Performance and Mortality During Simulated Production Conditions The objective of the study is to determine the performance response and mortality of broilers fed plasma in pelleted feed during simulated production conditions.

Materials and Methods

One hundred eighty Ross×Ross 308 male broilers (Welp Hatchery, Bancroft, Iowa; 1 d of age; 34.9 g) were randomly assigned to receive one of three experimental treatments.

Treatments were control (no plasma), plasma coated post-pelleting, or plasma blended into the meal and then pelleted at target pellet conditioning temperature of 85° C. according to Table 1. The feeding program consisted of three phases: a "starter" phase from days 0 to 14; a "grower" phase from days 15 to 28; and a "finisher" phase from d 29 to 42.

TABLE 1

Experimental treatments

| Trt | Feed D 0 to 14 | Feed D 15 to 28 | Feed D 29 to 42 | Feed Process | Pellet Conditioning Temperature | Plasma Location |
|---|---|---|---|---|---|---|
| 1 | Control | Control | Control | Pelleted | 185° F./85° C. | None |
| 2 | 1.0% Plasma | 0.5% Plasma | 0.25% Plasma | Pelleted | 185° F./85° C. | Coated outside |
| 3 | 1.0% Plasma | 0.5% Plasma | 0.25% Plasma | Pelleted | 185° F./85° C. | Inside pellet |

Spray-dried plasma (AP 920; APC Inc., Ankeny, Iowa) was produced according to standard manufacturing procedures. This plasma is a high-protein ingredient composed of spray-dried bovine plasma. It is a free-flowing, light tan colored powder having the following characteristics: crude protein, minimum 78%; crude fat, minimum 0.3%; crude fiber, maximum 0.5%; moisture, maximum 9%; ash, maximum 10%; and sodium, maximum 3%. Water was delivered via free-standing 3.8 L poultry founts (CT Farm and Country, Ames, Iowa). The founts were washed daily and refilled with fresh water. Feed was manufactured utilizing formulas in Table 2. The manufacturing process resulted in the feed being mixed with part of the fat, pelleted, and crumbled according to industry standards. The feed was crumbled for the starter phase only. Diets were pelleted at their respective conditioning temperatures (Table 3) using a 5/32 inch×1¼ inch die and conditioning retention time of 15 seconds. After crumbling or pelleting, diets were placed in a dry mixer for addition of the remaining fat with or without plasma added to the mixer post-pelleting. Feed was offered ad libitum in trays (729 cm$^2$) from days 0 to 3. Thereafter, feed was offered in hanging gravity flow feeders (Brower®, Houghton, Iowa). The hanging feeders were adjusted regularly to maintain optimal height for feed consumption. Broilers (6 per pen; 10 pens per treatment) were housed in floor pens (56×122 cm).

Pens contained used softwood shavings as litter (approximately 10 cm depth). Heat lamps maintained mean temperatures, at bird level, of 32° C., 29° C., 27° C., and 24° C. for week 1, 2, 3, 4, and to the end, respectively. Broilers were maintained on 23 hour light and 1 hour dark cycle.

Vaccinations at pre-hatch were ½ dose of Mareks and prior to shipping ½ dose of Newcastle and Bronchitis at the hatchery. On day 7, all birds were vaccinated with Bursal Disease vaccine (Merial Select, Inc., Gainsville, Ga.) via the water and on d 14 vaccinated with Newcastle-Bronchitis vaccine (B1 B1; Merial Select, Inc., Gainsville, Ga.) by coarse spray.

Feed intake and mortality were measured daily. Pen weights were measured daily for the initial 7 days of the experiment, and then weekly thereafter. Individual body weights were measured on day 0 and 42.

Data were analyzed as a randomized complete block design using the GLM procedures of SAS (SAS, 1990). Pen was the experimental unit, while placement within the facility was the blocking criterion. Least squares means are reported.

Results

Average daily gain (ADG) and average daily feed intake (ADFI) were increased (P<0.05) during the starter period (days 0 to 14) due to plasma consumption, regardless of location in feed or pellet conditioning temperature (Table 4). Feed efficiency (gain:feed) was unaffected (P>0.05) by plasma consumption compared to the control. During the grower period (days 15 to 28), ADG and ADFI were increased (P<0.05) due to plasma consumption, regardless of location in feed or pellet conditioning temperature (Table 4). Feed efficiency was unaffected (P>0.05) by plasma consumption compared to control. By the finisher period (days 29 to 42), ADG, ADFI, and feed efficiency were unaffected (P>0.05) by plasma consumption compared to the control.

Overall (days 0 to 42), ADFI was increased (P<0.08) due to plasma consumption, regardless of location in feed or pellet conditioning temperature compared to the control. Average daily gain and feed efficiency were unaffected (P>0.05) by plasma consumption compared to the control.

Body weight (BW; Table 5) was increased (P<0.05) due to plasma consumption, regardless of location in feed or pellet conditioning temperature compared to the control from days 7 to 28. By day 42, BW was numerically increased by 62 to 125 grams per bird due to plasma consumption compared to the control. Survival (Table 5) was unaffected (P>0.05) by treatment.

Plasma consumption significantly improved broiler performance during the first 28 days, regardless of location in feed (outside vs. inside) or pellet conditioning temperature, for example, up to 85° C. Thus, inclusion of plasma inside pelleted broiler feed at elevated conditioning temperature does not reduce broiler performance resulting from plasma consumption.

TABLE 2

Formula and nutrient analysis of diets on an as-is basis (%).

| | Formula ID | | | | | |
|---|---|---|---|---|---|---|
| | 1 | 2 | 3 | 4 | 5 | 6 |
| | Days Fed | | | | | |
| | 0 to 14 % | 0 to 14 % | 15 to 28 % | 15 to 28 % | 29 to 42 % | 29 to 42 % |
| Ingredients | | | | | | |
| Corn | 57.663 | 59.234 | 60.121 | 60.907 | 65.432 | 65.825 |
| Soybean meal, 47% | 35.601 | 33.725 | 32.045 | 31.106 | 26.969 | 26.500 |
| Spray-dried plasma[1] | 0 | 1.00 | 0 | 0.50 | 0 | 0.25 |
| Animal/Vegetable Fat | 2.635 | 2.072 | 3.936 | 3.655 | 3.891 | 3.75 |
| Dical - 18.5% | 1.76 | 1.687 | 1.629 | 1.593 | 1.558 | 1.54 |
| Limestone | 1.295 | 1.345 | 1.264 | 1.289 | 1.208 | 1.221 |

TABLE 2-continued

Formula and nutrient analysis of diets on an as-is basis (%).

| | Formula ID | | | | | |
|---|---|---|---|---|---|---|
| | 1 | 2 | 3 | 4 | 5 | 6 |
| | Days Fed | | | | | |
| | 0 to 14 % | 0 to 14 % | 15 to 28 % | 15 to 28 % | 29 to 42 % | 29 to 42 % |
| Vitamin/Mineral Premix | 0.25 | 0.25 | 0.25 | 0.25 | 0.25 | 0.25 |
| Coban 60[2] | 0.075 | 0.075 | 0.075 | 0.075 | 0.075 | 0.075 |
| Salt | 0.468 | 0.389 | 0.471 | 0.431 | 0.473 | 0.453 |
| DL methionine | 0.327 | 0.223 | 0.19 | 0.183 | 0.129 | 0.125 |
| L Lysine HCl | 0.016 | 0 | 0.019 | 0.011 | 0.015 | 0.011 |
| Total | 100.000 | 100.000 | 100.000 | 100.000 | 100.000 | 100.000 |
| Calculated Nutrient Analysis | | | | | | |
| Crude Protein, % | 21.50 | 21.50 | 20.00 | 20.00 | 18.00 | 18.00 |
| Fat, % | 5.21 | 4.70 | 6.56 | 6.31 | 6.67 | 6.55 |
| ME. Kcal/kg | 3050 | 3050 | 3150 | 3150 | 3200 | 3200 |
| Ash, % | 5.66 | 5.64 | 5.35 | 5.34 | 5.02 | 5.02 |
| Ca, % | 1.00 | 1.00 | 0.95 | 0.95 | 0.90 | 0.90 |
| P, % | 0.70 | 0.70 | 0.66 | 0.66 | 0.63 | 0.63 |
| Inorg P, % | 0.45 | 0.45 | 0.42 | 0.42 | 0.40 | 0.40 |
| Na, % | 0.20 | 0.20 | 0.20 | 0.20 | 0.20 | 0.20 |
| Cl, % | 0.32 | 0.29 | 0.33 | 0.31 | 0.33 | 0.32 |
| K, % | 0.84 | 0.81 | 0.78 | 0.77 | 0.70 | 0.69 |
| Lysine, % | 1.25 | 1.25 | 1.15 | 1.15 | 1.00 | 1.00 |
| Methionine, % | 0.58 | 0.57 | 0.52 | 0.51 | 0.43 | 0.43 |
| Methionine + Cystine, % | 0.95 | 0.95 | 0.86 | 0.86 | 0.75 | 0.75 |
| Tryptophan, % | 0.30 | 0.30 | 0.28 | 0.28 | 0.25 | 0.25 |
| Threonine, % | 0.83 | 0.85 | 0.77 | 0.78 | 0.69 | 0.70 |
| Isoleucine, % | 1.10 | 1.08 | 1.02 | 1.01 | 0.90 | 0.90 |

[1]Spray-dried plasma of bovine origin (AP 920; APC, Inc., Ankeny, IA).
[2]Provided per 907 kg of diet: monensin, 90 g.

TABLE 3

Feed manufacturing conditions of diets[1]

| Formula ID | Starter (d 0 to 14) | | | Grower (d 15 to 28) | | | Finisher (d 29 to 42) | | |
|---|---|---|---|---|---|---|---|---|---|
| | 1 | 2 | 2 | 3 | 4 | 4 | 5 | 6 | 6 |
| Pellet conditioning temp., °C. | 85 | 85.3 | 85 | 85.6 | 85.3 | 85.4 | 85.5 | 85.4 | 85.2 |
| Hot pellet temp., °C. | 85 | 86.6 | 86.2 | 85.7 | 87 | 86.5 | 87.5 | 86.8 | 86.9 |

[1]Pellet conditioning retention time was 15 seconds with a production rate of 3600 pounds/hour.

TABLE 4

Least squares means of broiler performance consuming plasma in dry feed[1,2]

| Plasma Location | Control | Coated Outside Pellet conditioning temperature, °C. | Coated Inside Pellet conditioning temperature, °C. | SEM[3] | Contrasts (P < )[4] | |
|---|---|---|---|---|---|---|
| | 85 | 85 | 85 | | 1 | 2 |
| Treatment Day 0 to 14 | 1 | 2 | 3 | | | |
| ADG, g/d | 28.40 | 29.16 | 30.01 | 0.33 | 0.0094 | 0.0877 |
| ADFI, g/d | 36.65 | 38.65 | 38.38 | 0.45 | 0.0036 | NS |
| Gain:feed | 0.778 | 0.756 | 0.785 | 0.004 | NS | 0.0001 |
| Day 15 to 28 | | | | | | |
| ADG, g/d | 76.26 | 80.62 | 78.69 | 1.10 | 0.0210 | NS |
| ADFI, g/d | 114.69 | 121.74 | 117.57 | 1.58 | 0.0197 | 0.0783 |
| Gain:feed | 0.665 | 0.662 | 0.670 | 0.005 | NS | NS |
| Day 29 to 42 | | | | | | |
| ADG, g/d | 96.62 | 97.32 | 95.54 | 1.88 | NS | NS |
| ADFI, g/d | 176.51 | 178.50 | 179.68 | 2.97 | NS | NS |
| Gain:feed | 0.547 | 0.545 | 0.532 | 0.005 | NS | 0.0542 |
| Day 0 to 42 | | | | | | |
| ADG, g/d | 66.79 | 68.76 | 67.58 | 0.81 | NS | NS |
| ADFI, g/d | 109.28 | 112.98 | 111.88 | 1.39 | 0.0800 | NS |
| Gain:feed | 0.615 | 0.612 | 0.610 | 0.004 | NS | NS |

[1]Values represent the mean of ten replicates per treatment with six broilers per pen.
[2]NS = non-significant (P > 0.10).
[3]Standard error of the mean.
[4]Contrasts were as follows: 1) control (treatment 1) vs. spray-dried plasma (treatments 2 and 3); 2) coated spray-dried plasma (treatment 2) vs. pelleted spray-dried plasma (treatments 3).

TABLE 5

Least squares means of body weight and survival[1,2]

| Plasma Location | Control 85 | Coated Outside Pellet conditioning temperature, °C. 85 | Inside 85 | SEM[3] | Contrasts (P < )[4] 1 | 2 |
|---|---|---|---|---|---|---|
| Treatment | 1 | 2 | 3 | | | |
| Day | | | | | | |
| 0 | 34.88 | 34.88 | 34.88 | 0.06 | NS | NS |
| 7 | 152.42 | 156.13 | 159.87 | 2.04 | 0.0383 | NS |
| 14 | 433.55 | 444.67 | 458.01 | 4.99 | 0.0093 | 0.0748 |
| 21 | 907.13 | 947.34 | 959.64 | 8.99 | 0.0005 | NS |
| 28 | 1501.16 | 1573.31 | 1559.63 | 18.49 | 0.0099 | NS |
| 35 | 2208.11 | 2272.34 | 2158.63 | 34.10 | NS | 0.0299 |
| 42 | 2829.84 | 955.46 | 2891.65 | 48.33 | NS | NS |
| Survival, % | 93.3 | 95.0 | 95.0 | 2.7 | NS | NS |

[1]Values represent the mean of ten replicates per treatment with six broilers per pen.
[2]NS = non-significant (P > 0.10).
[3]Standard error of the mean.
[4]Contrasts were as follows: 1) control (treatment 1) vs. spray-dried plasma (treatments 2 and 3); 2) coated spray-dried plasma (treatment 2) vs. pelleted spray-dried plasma (treatments 3).

EXAMPLE 2

Effects of Increasing Pellet Conditioning Temperature of Broiler Feed Containing Plasma on Performance and Mortality During Simulated Production Conditions The objective of the study was to determine the performance response and mortality of broilers fed plasma in the feed from higher pellet conditioning temperatures during simulated production conditions.

Materials and Methods

Two hundred forty Ross×Ross 308 male broilers (Welp Hatchery, Bancroft, Iowa; 1 d of age; 39.0 g) were randomly assigned to receive one of five experimental treatments. Treatments were control (no plasma), plasma coated post-pelleting, or plasma blended into the meal and then pelleted at target pellet conditioning temperatures of 85° C., 90° C., or 95° C. (see Table 6). The feeding program consisted of three feeding phases: a "starter" phase from days 0 to 14; a "grower" phase from days 15 to 28; and a "finisher" phase from days 29 to 42.

Spray-dried plasma (AP 920; APC Inc., Ankeny, Iowa) was produced according to standard manufacturing procedures. Water was delivered via free-standing 3.8 L poultry founts (CT Farm and Country, Ames, Iowa). The founts were washed and refilled with fresh water daily.

Feed was manufactured according to the formulas in Table 7. The manufacturing process resulted in the feed being mixed with part of the fat, pelleted, and crumbled according to industry standards. The feed was crumbled for the starter phase only. Diets were pelleted at their respective conditioning temperatures (Table 8) using a 5/32 inch×1 1/4 inch die and conditioning retention time of 15 seconds. After crumbling or pelleting diets were placed in a dry mixer for addition of the remaining fat with or without plasma added to the mixer post-pelleting.

Feed was offered ad libitum in trays (729 cm²) from days 0 to 3. After day 3, feed was offered in hanging gravity flow feeders (Brower®, Houghton, Iowa). The hanging feeders were adjusted regularly to maintain optimal height for feed consumption. Broilers (6 per pen; 8 pens per treatment) were housed in floor pens (56×122 cm).

Pens contained used softwood shavings as litter (approximately 10 cm depth). Heat lamps maintained mean temperatures, at bird level, of 32° C., 29° C., 27° C., and 24° C. for week 1, 2, 3, 4, and to the end, respectively. Broilers were maintained on a 23 hour light and 1 hour dark schedule.

Vaccinations at pre-hatch were 1/2 dose of Mareks and prior to shipping 1/2 dose of Newcastle and Bronchitis at the hatchery. On day 7, all birds were vaccinated with Bursal Disease vaccine (Merial Select, Inc., Gainsville, Ga.) via the water and on day 14 vaccinated with Newcastle-Bronchitis vaccine (B1 B1; Merial Select, Inc., Gainsville, Ga.) by coarse spray.

Feed intake and mortality were measured daily. Pen weights were measured daily for the initial 7 days of the experiment, and then weekly thereafter. Individual body weights were measured on day 0 and 42.

Data were analyzed as a randomized complete block design using the GLM procedures of SAS (SAS, 1990). Pen was the experimental unit, while placement within the facility was the blocking criterion. Least squares means are reported.

Results

Average daily gain (ADG) and feed efficiency were increased (P<0.05) during the starter period (days 0 to 14) due to plasma consumption regardless of placement on feed or pellet conditioning temperatures (Table 9). Average daily feed intake (ADFI) was unaffected (P>0.05) by treatment during the starter period of the study. During the grower period (days 15 to 28), ADG, ADFI, and feed efficiency were increased (P<0.05) due to plasma consumption regardless of placement on feed or pellet conditioning temperatures (Table 9). By the finisher period (days 29 to 42), ADG, ADFI, and feed efficiency were unaffected (P>0.05) by plasma consumption compared to the control.

Overall (days 0 to 42), ADG and ADFI were increased (P<0.05) due to plasma consumption, regardless of placement of plasma on feed or pellet conditioning temperatures, as compared to the control. Furthermore, and unexpectedly, ADG was greater (P<0.05) when plasma was included inside the pellet as compared to outside. Feed efficiency tended (P<0.10) to be increased due to plasma consumption regard-

TABLE 6

Experimental treatments

| Trt | Fed Days 0 to 14 | Fed Days 15 to 28 | Fed Days 29 to 42 | Feed Process | Target Pellet Conditioning Temperature | Plasma Location |
|---|---|---|---|---|---|---|
| 1 | Control | Control | Control | Pelleted | 185° F./85° C. | None |
| 2 | 1.0% Plasma | 0.5% Plasma | 0.25% Plasma | Pelleted | 185° F./85° C. | Outside |
| 3 | 1.0% Plasma | 0.5% Plasma | 0.25% Plasma | Pelleted | 185° F./85° C. | Inside |
| 4 | 1.0% Plasma | 0.5% Plasma | 0.25% Plasma | Pelleted | 194° F./90° C. | Inside |
| 5 | 1.0% Plasma | 0.5% Plasma | 0.25% Plasma | Pelleted | 203° F./95° C. | Inside | less of placement on feed or pellet conditioning temperatures compared to the control. Body weight (Table 10) was increased (P<0.05) due to plasma consumption, regardless of placement on feed or pellet conditioning temperatures compared to the control from days 14 to 42. Unexpectedly, the greatest improvement in body weight was noted from consumption of feed containing plasma inside the pellet as compared to outside (P<0.05). Survival (Table 10) was unaffected (P>0.05) by treatment. Therefore, increasing pellet conditioning temperature did not reduce (P>0.05) the improved performance associated with consumption of plasma.

Consumption of plasma improved overall performance regardless of placement on feed (outside vs. inside) or pellet conditioning temperatures (for example, up to 95° C.). Unexpectedly, increasing pellet conditioning temperatures of poultry feed does not affect broiler performance resulting from plasma consumption.

TABLE 7

Formula and calculated analysis of diets on an as-is basis (%).

| | Formula ID | | | | | |
|---|---|---|---|---|---|---|
| | 1 | 2 | 3 | 4 | 5 | 6 |
| | Days Fed | | | | | |
| | 0 to 14 % | 0 to 14 % | 15 to 28 % | 15 to 28 % | 29 to 42 % | 29 to 42 % |
| Ingredients | | | | | | |
| Corn | 57.39 | 58.95 | 59.85 | 60.63 | 65.16 | 65.55 |
| Soybean meal, 47% | 35.66 | 33.77 | 32.09 | 31.16 | 27.02 | 26.55 |
| Spray-dried plasma[1] | 0 | 1.00 | 0 | 0.50 | 0 | 0.25 |
| Animal/Vegetable Fat | 2.73 | 2.18 | 4.03 | 3.76 | 3.99 | 3.85 |
| Dical - 18.5% | 1.76 | 1.69 | 1.63 | 1.59 | 1.56 | 1.54 |
| Limestone | 1.30 | 1.34 | 1.26 | 1.29 | 1.21 | 1.22 |
| Vitamin/Mineral Premix | 0.375 | 0.375 | 0.375 | 0.375 | 0.375 | 0.375 |
| Coban 60[2] | 0.075 | 0.075 | 0.075 | 0.075 | 0.075 | 0.075 |
| Salt | 0.468 | 0.389 | 0.471 | 0.431 | 0.473 | 0.453 |
| DL methionine | 0.237 | 0.223 | 0.190 | 0.183 | 0.129 | 0.126 |
| L Lysine HCl | 0.010 | 0 | 0.018 | 0.010 | 0.014 | 0.010 |
| Total | 100.000 | 100.000 | 100.000 | 100.000 | 100.000 | 100.000 |
| Calculated Nutrient Analysis | | | | | | |
| Crude Protein, % | 21.50 | 21.50 | 20.00 | 20.00 | 18.00 | 18.00 |
| Fat, % | 5.30 | 4.80 | 6.65 | 6.40 | 6.76 | 6.64 |
| ME, Kcal/kg | 3050 | 3050 | 3150 | 3150 | 3200 | 3200 |
| Ash, % | 5.74 | 5.72 | 5.43 | 5.42 | 5.10 | 5.10 |
| Ca, % | 1.00 | 1.00 | 0.95 | 0.95 | 0.90 | 0.90 |
| P, % | 0.70 | 0.70 | 0.66 | 0.66 | 0.63 | 0.63 |
| Inorg P, % | 0.45 | 0.45 | 0.42 | 0.42 | 0.40 | 0.40 |
| Na, % | 0.20 | 0.20 | 0.20 | 0.20 | 0.20 | 0.20 |
| Cl, % | 0.32 | 0.29 | 0.33 | 0.31 | 0.33 | 0.32 |
| K, % | 0.84 | 0.81 | 0.78 | 0.77 | 0.70 | 0.69 |
| Lysine, % | 1.25 | 1.25 | 1.15 | 1.15 | 1.00 | 1.00 |
| Methionine, % | 0.58 | 0.57 | 0.52 | 0.51 | 0.43 | 0.43 |
| Methionine + Cystine, % | 0.95 | 0.95 | 0.86 | 0.86 | 0.75 | 0.75 |
| Tryptophan, % | 0.30 | 0.30 | 0.28 | 0.28 | 0.25 | 0.25 |
| Threonine, % | 0.83 | 0.85 | 0.77 | 0.78 | 0.69 | 0.70 |
| Isoleucine, % | 1.10 | 1.08 | 1.02 | 1.01 | 0.90 | 0.90 |

[1]Spray-dried plasma of bovine origin (AP 920; APC, Inc., Ankeny, IA).
[2]Provided per 907 kg of diet: monensin, 90 g

TABLE 8

Feed manufacturing conditions of diets[1]

| | Starter (d 0 to 14) | | | | | Grower (d 15 to 28) | | | | | Finisher (d 29 to 42) | | | | |
|---|---|---|---|---|---|---|---|---|---|---|---|---|---|---|---|
| Formula ID | 1 | 2 | 2 | 2 | 2 | 3 | 4 | 4 | 4 | 4 | 5 | 6 | 6 | 6 | 6 |
| Pellet conditioning temp., ° C. | 85 | 85 | 85 | 90.5 | 93.3 | 85.5 | 85.3 | 85 | 90.3 | 93.9 | 85.5 | 85.3 | 85 | 90 | 93.3 |
| Hot pellet temp., ° C. | 86.1 | 86.1 | 86.4 | 91.1 | 94.4 | 86.7 | 86.9 | 86.1 | 91.1 | 93.9 | 86.1 | 86.1 | 86.9 | 90.5 | 93.9 |

[1]Pellet conditioning retention time was 15 seconds with a production rate of 3500 pounds/hour.

TABLE 9

Least squares means of broiler performance consuming plasma in dry feed[1,2]

| | | Plasma Location | | | | | | Contrasts (P<)[4] | | |
|---|---|---|---|---|---|---|---|---|---|---|
| | Control | Outside | Inside | Inside | Inside | | | | | |
| | Pellet conditioning temperature, °C. | | | | | | | | | |
| Item | 85 | 85 | 85 | 90 | 95 | SEM[3] | 1 | 2 | 3 | 4 |
| Treatment | 1 | 2 | 3 | 4 | 5 | | | | | |
| Days 0 to 14 | | | | | | | | | | |
| ADG, g/d | 26.92 | 28.39 | 28.26 | 28.94 | 28.45 | 0.58 | 0.0201 | NS | NS | NS |
| ADFI, g/d | 36.50 | 37.00 | 37.16 | 37.80 | 37.45 | 0.64 | NS | NS | NS | NS |
| Gain:feed | 0.737 | 0.772 | 0.761 | 0.766 | 0.763 | 0.009 | 0.0090 | NS | NS | NS |
| Days 15 to 28 | | | | | | | | | | |
| ADG, g/d | 72.05 | 78.54 | 78.71 | 79.57 | 80.55 | 1.57 | 0.0003 | NS | NS | NS |
| ADFI, g/d | 109.63 | 116.67 | 116.24 | 117.64 | 117.27 | 2.49 | 0.0135 | NS | NS | NS |
| Gain:feed | 0.659 | 0.675 | 0.677 | 0.677 | 0.687 | 0.005 | 0.0018 | NS | NS | NS |
| Days 29 to 42 | | | | | | | | | | |
| ADG, g/d | 87.45 | 83.97 | 90.31 | 90.23 | 89.30 | 1.93 | NS | 0.0121 | NS | NS |
| ADFI, g/d | 172.86 | 171.56 | 178.17 | 178.95 | 180.49 | 2.93 | NS | 0.0318 | NS | NS |
| Gain:feed | 0.506 | 0.489 | 0.507 | 0.504 | 0.493 | 0.007 | NS | NS | NS | NS |
| Days 0 to 42 | | | | | | | | | | |
| ADG, g/d | 61.49 | 62.80 | 65.09 | 66.12 | 65.40 | 0.97 | 0.0044 | 0.0213 | NS | NS |
| ADFI, g/d | 106.33 | 108.41 | 110.52 | 111.46 | 111.74 | 1.60 | 0.0257 | NS | NS | NS |
| Gain:feed | 0.588 | 0.592 | 0.599 | 0.595 | 0.594 | 0.004 | 0.0990 | NS | NS | NS |

[1]Values represent the mean of eight replicates per treatment with six broilers per pen.
[2]NS = nonsignificant (P > 0.10).
[3]Standard error of the mean.
[4]Contrasts were as follows: 1) control (treatment 1) vs. spray-dried plasma (treatments 2, 3, 4, and 5); 2) spray-dried plasma coated outside (treatment 2) vs. spray-dried plasma inside pellet (treatments 3, 4, and 5); 3) conditioning temperature (treatments 3, 4, and 5) linear; and 4) conditioning temperature (treatments 3, 4, and 5) quadratic.

TABLE 10

Least squares means of body weight and survival[1,2]

| | | Plasma Location | | | | | | Contrasts (P<)[4] | | |
|---|---|---|---|---|---|---|---|---|---|---|
| | | Coated | | | | | | | | |
| | Control | Outside | Inside | Inside | Inside | | | | | |
| | Pellet conditioning temperature, °C. | | | | | | | | | |
| Item | 85 | 85 | 85 | 90 | 95 | SEM[3] | 1 | 2 | 3 | 4 |
| Treatment | 1 | 2 | 3 | 4 | 5 | | | | | |
| Day | | | | | | | | | | |
| 0 | 39.0 | 39.0 | 39.0 | 39.0 | 39.0 | 0.06 | NS | NS | NS | NS |
| 7 | 154.9 | 160.0 | 157.4 | 158.6 | 160.5 | 2.92 | NS | NS | NS | NS |
| 14 | 416.3 | 439.6 | 434.6 | 444.2 | 435.9 | 7.89 | 0.0174 | NS | NS | NS |
| 21 | 854.8 | 914.8 | 911.5 | 917.2 | 917.8 | 16.96 | 0.0035 | NS | NS | NS |
| 28 | 1418.1 | 1541.3 | 1539.6 | 1558.2 | 1563.6 | 26.95 | 0.0001 | NS | NS | NS |
| 35 | 2097.7 | 2210.3 | 2227.2 | 2240.7 | 2287.4 | 33.25 | 0.0006 | NS | NS | NS |
| 42 | 2679.7 | 2708.6 | 2822.4 | 2839.6 | 2853.6 | 41.05 | 0.0102 | 0.0105 | NS | NS |
| Survival, % | 87.50 | 77.08 | 81.25 | 89.58 | 75.00 | 5.56 | NS | NS | NS | NS |

[1]Values represent the mean of eight replicates per treatment with six broilers per pen.
[2]NS = nonsignificant (P > 0.10).
[3]Standard error of the mean.
[4]Contrasts were as follows: 1) control (treatment 1) vs. spray-dried plasma (treatments 2, 3, 4, and 5); 2) spray-dried plasma coated outside (treatment 2) vs. spray-dried plasma inside pellet (treatments 3, 4, and 5); 3) conditioning temperature (treatments 3, 4, and 5) linear; and 4) conditioning temperature (treatments 3, 4, and 5) quadratic.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

All publications, patents and patent applications cited herein are herein incorporated by reference.

Documents Cited

Fairfield, "Pelleting for Profit—Part I", *Feed and Feeding Digest,* 54(6) (2003a).

Fairfield, "Pelleting for Profit—Part 2", *Feed and Feeding Digest,* 54(7) (2003b).

Feed Manufacturing Technology IV, American Feed Industry Association, Inc., Arlington, Va. (1994).

Nutrition Requirements of Poultry, 9th edition, National Academy Press, Washington, D.C. (1994).

Nutrition Requirements of Swine, 10th edition, National Academy Press, Washington, D.C. (1998).

SAS/STAT User's Guide, 4th edition. SAS Inst. Inc., Cary, N.C. (1990).

The Pelleting Handbook—A Guide for Production Staff in the Compound Feed Industry, Reedprint Limited, Windsor, Berkshire (1994).

Steidinger et al., *J. Anim. Sci.,* 78, 3014-3018 (2000).

What is claimed is:

1. A method for preparing a pelleted poultry feed, comprising:
   a) heating a mixture comprising a growth promoting amount of powdered animal plasma and poultry feed to a temperature of at least 85° C.; and
   b) pelleting the mixture to provide the pelleted poultry feed, wherein the pelleted poultry feed is pelleted chicken feed or pelleted turkey feed, and wherein the pelleted poultry feed comprises a growth-promoting amount of powdered animal plasma that promotes poultry growth to a greater extent than does a pelleted poultry feed that does not contain plasma.

2. The method of claim 1, wherein the animal plasma is spray-dried, freeze-dried, and/or paddle-dried animal plasma.

3. The method of claim 1, wherein the animal plasma is from a bovine, porcine, or avian source.

4. The method of claim 1, wherein the animal plasma in the mixture is in the form of unseparated whole blood.

5. The method of claim 1, wherein the poultry feed is turkey feed.

6. The method of claim 1, wherein the poultry feed is chicken feed.

7. The method of claim 6, wherein the chicken feed is feed for layers.

8. The method of claim 6, wherein the chicken feed is feed for broilers.

9. The method of claim 1, wherein the mixture comprising the plasma and the poultry feed is heated to a temperature of at least 90° C.

10. The method of claim 9, wherein the mixture comprising the plasma and the poultry feed is heated to a temperature of at least 95° C.

11. The method of claim 1, wherein the pelleted poultry feed comprises about 1% plasma.

12. The method of claim 1, wherein the pelleted poultry feed comprises about 0.5% plasma.

13. The method of claim 1, wherein the pelleted poultry feed comprises about 0.25% plasma.

14. The method of claim 1, wherein the pelleted poultry feed comprises about 0.1% to about 5% plasma.

15. The method of claim 14, wherein the pelleted poultry feed comprises about 0.25% to about 1% plasma.

16. The method of claim 1, further comprising processing the mixture with an expander prior to pelleting.

17. The method of claim 1, further comprising crumbling the pelleted poultry feed.

18. The method of claim 1, wherein the growth-promoting amount of powdered animal plasma that promotes poultry growth is an amount that increases the average daily gain (ADG) of the poultry to a greater extent than does a pelleted poultry feed that does not contain plasma.

19. The method of claim 1, wherein the growth-promoting amount of animal plasma in a form that promotes poultry growth is an amount that increases the average daily feed intake (ADFI) of the poultry to a greater extent than does a pelleted poultry feed that does not contain plasma.

20. The method of claim 1, wherein the growth-promoting amount of animal plasma in a form that promotes poultry growth is an amount that increases the body weight (BW) of the poultry to a greater extent than does a pelleted poultry feed that does not contain plasma.

21. The method of claim 1, wherein the growth-promoting amount of animal plasma in a form that promotes poultry growth is an amount that increases the feed efficiency (gain: feed) of the poultry to a greater extent than does a pelleted poultry feed that does not contain plasma.

22. A pelleted poultry feed prepared according to the method of claim 1.

23. A method for enhancing the growth of poultry, comprising feeding to poultry an effective amount of the pelleted poultry feed of claim 22.

24. The method of claim 23, wherein the poultry are turkeys.

25. The method of claim 23, wherein the poultry are chickens.

26. The method of claim 25, wherein the chickens are layers.

27. The method of claim 25, wherein the chickens are broilers.

* * * * *

UNITED STATES PATENT AND TRADEMARK OFFICE
CERTIFICATE OF CORRECTION

PATENT NO. : 7,419,682 B2  Page 1 of 1
APPLICATION NO. : 10/929836
DATED : September 2, 2008
INVENTOR(S) : Campbell et al.

It is certified that error appears in the above-identified patent and that said Letters Patent is hereby corrected as shown below:

In column 12, line 7, delete "d" and insert -- day --, therefor.

In column 15, line 19, delete "955.46" and insert -- 2955.46 --, therefor.

Signed and Sealed this

Sixteenth Day of December, 2008

JON W. DUDAS
*Director of the United States Patent and Trademark Office*